(12) United States Patent
Tzadok et al.

(10) Patent No.: US 11,271,301 B2
(45) Date of Patent: Mar. 8, 2022

(54) COORDINATED WAVEFORM GENERATION, CONTROL, AND ASSOCIATED BEAM STEERING

(71) Applicant: International Business Machines Corporation, Armonk, NY (US)

(72) Inventors: Asaf Tzadok, New Castle, NY (US); Alberto Valdes Garcia, Chappaqua, NY (US); Mark Yeck, Yorktown Heights, NY (US); Huijuan Liu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 16/428,572

(22) Filed: May 31, 2019

(65) Prior Publication Data

US 2020/0381823 A1 Dec. 3, 2020

(51) Int. Cl.
*H01Q 3/36* (2006.01)
*H01Q 21/22* (2006.01)

(52) U.S. Cl.
CPC ............... *H01Q 3/36* (2013.01); *H01Q 21/22* (2013.01)

(58) Field of Classification Search
CPC combination set(s) only.
See application file for complete search history.

(56) References Cited

U.S. PATENT DOCUMENTS

| | | | |
|---|---|---|---|
| 4,217,587 A | 8/1980 | Jacomini | |
| 5,008,680 A | 4/1991 | Willey et al. | |
| 5,128,683 A | 7/1992 | Freedman et al. | |
| 5,771,016 A | 6/1998 | Mullins et al. | |
| 5,808,578 A * | 9/1998 | Barbella | G01S 7/4026 |
| | | | 342/62 |
| 9,070,972 B2 | 6/2015 | Wang et al. | |
| 9,285,461 B2 | 3/2016 | Swirhun et al. | |
| 9,479,232 B1 | 10/2016 | Loui et al. | |
| 2009/0231195 A1* | 9/2009 | Chang | H01Q 3/2605 |
| | | | 342/372 |
| 2015/0268328 A1* | 9/2015 | Johnson | G01S 13/10 |
| | | | 342/21 |
| 2018/0143296 A1* | 5/2018 | Lee | G01S 7/35 |
| 2019/0195985 A1* | 6/2019 | Lin | G01S 7/40 |
| 2020/0292663 A1* | 9/2020 | Bai | G01S 13/42 |

FOREIGN PATENT DOCUMENTS

CN 105699945 B 12/2017

* cited by examiner

*Primary Examiner* — Junpeng Chen
(74) *Attorney, Agent, or Firm* — Daniel Morris; Otterstedt, Wallace & Kammer, LLP

(57) ABSTRACT

While a radar waveform generator coupled to a phased antenna array is inactive, a beam steering command is provided to the phased antenna array to cause the phased antenna array be configured for a given transmit and receive direction. While the radar waveform generator is active, received radar results are assigned to the given transmit and receive direction. the providing of the command and the assigning are repeated for a plurality of additional transmit and receive directions corresponding to a desired scan area.

18 Claims, 9 Drawing Sheets

| Signal Name | Direction | Function |
|---|---|---|
| WAVEFORM_ON | in | a synchronized digital signal to start beamforming in a new direction |
| STEERING | out | Configuration for a direction is in progress |
| NEW_LINE | out | Indication a new line of beamsteering, i.e. configuration for 1st direction in a new line (row) in the beam array starts |
| NEW_CYCLE | out | Indicating a new cycle of beamsteering, i.e. configuration for 1st direction in the beam array starts |
| ENABLE_TX/RX | out | 9 bits, output enable of "CLK (1 bit)" and "DATA (8 bits)" signals. When asserted, CLK and DATA signals are driven by FPGA, otherwise, driven by phased array IC. |
| CLK_TX/RX | out | Providing a clock for phased array IC digital logic |
| DATA_TX/RX | In/out | Configuration info (r/w, address and data) for phased array IC's internal registers |

*FIG. 6*

COORDINATED WAVEFORM GENERATION, CONTROL, AND ASSOCIATED BEAM STEERING

BACKGROUND

The present invention relates to the electrical, electronic and computer arts, and more specifically, to control of antennas for radar systems.

A general radar imaging system includes (1) waveform generation, (2) waveform acquisition, (3) a transmitter that transmits the waveform into the scene in one more directions, (4) a receiver that receives reflected signals (receiver), and (5) one or more components to discern the direction from which the signals are reflected. A phased array antenna system can be used to form transmit and receive beams in specific directions, therefore yielding knowledge of the direction of the objects causing the reflections.

SUMMARY

Principles of the invention provide techniques for coordinated waveform generation, control, and associated beam steering. In one aspect, an exemplary method includes the step of, while a radar waveform generator coupled to a phased antenna array is inactive, providing a beam steering command to the phased antenna array to cause the phased antenna array be configured for a given transmit and receive direction; while the radar waveform generator is active, assigning received radar results to the given transmit and receive direction; and repeating the providing of the command and the assigning for a plurality of additional transmit and receive directions corresponding to a desired scan area.

In another aspect, an exemplary system includes a radar waveform generator; a phased antenna array coupled to the radar waveform generator; a beam steering and timing acquisition control block coupled to the radar waveform generator and the phased antenna array; and a processing unit coupled to the beam steering and timing acquisition control block. the beam steering and timing acquisition control block is configured to provide a beam steering command to the phased antenna array to cause the phased antenna array be configured for a given transmit and receive direction, while the radar waveform generator is inactive. Radar results corresponding to the given transmit and receive direction are received at the phased array antenna for a time period while the radar waveform generator is active and the processing unit assigns the received radar results to the given transmit and receive direction. the beam steering and timing acquisition control block causes repetition of the providing of the beam steering command and the receiving of the results for a plurality of additional transmit and receive directions corresponding to a desired scan area.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

Ability of the waveform generator to operate on its own, creating an output waveform periodically—different waveform generators can be employed without creating other dependencies in the system implementation;

The timing and phased array control can be implemented with a microcontroller unit (MCU) or a field-programmable gate array (FPGA) independently, and inexpensively—this control block can be adapted to different phased arrays;

The processing unit receives the radar signals and timing markers but it is not necessarily involved in the timing control—this is advantageous since the processing unit generally runs complex software (SW) and depends on an operating system which could introduce latency and timing uncertainties.

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 depicts input and output details for beam steering in autoloop mode according to an embodiment of the present invention;

FIG. 8 depicts a computer system that may be useful in implementing one or more aspects and/or elements of the

DETAILED DESCRIPTION

Figure 1:
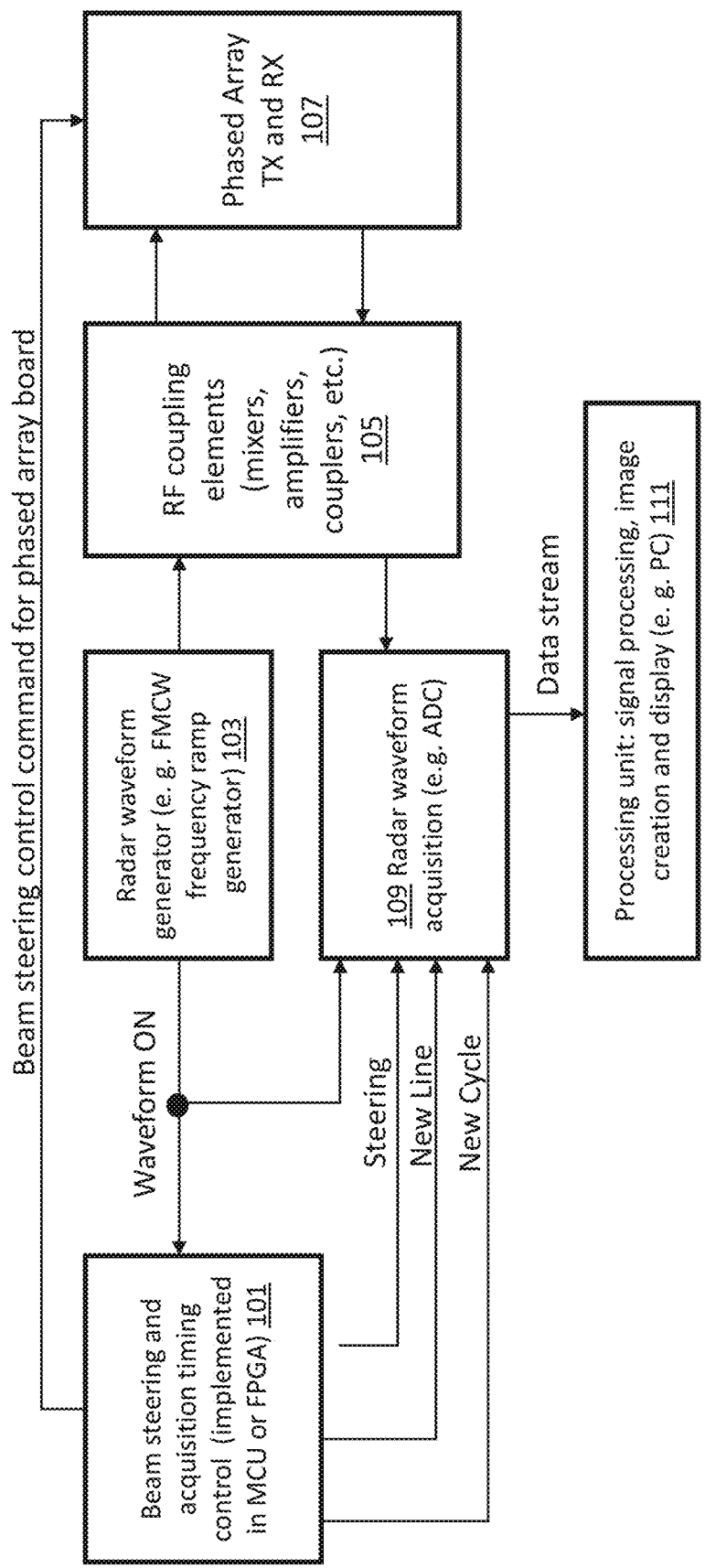
FIG. 1 depicts a generalized block diagram according to an embodiment of the present invention.

Aspects of the invention provide systems, methods, and/or computer program products for coordinated waveform generation, control, and associated beam steering. Indeed, techniques are provided for coordinated waveform generation, control, and associated beam steering in a radar imaging system. In order to obtain radar images in real time (tens of frames per second or faster) using a phased array, one or more embodiments advantageously provide accurate and systematic coordination between waveform generation, acquisition, and beam steering.

As will be appreciated by the skilled artisan, radar systems generate an electromagnetic wave at a transmitter (more typically a transceiver which both transmits and receives). One or more embodiments relate to active radar wherein a signal is sent and a reflection comes back. Radar is used, for example, for range finding; it is desired to be able to detect the distance of the object from which the transmitted radiation has been reflected. The speed of the object can also be determined; indeed, in general, radars can find the position and velocity of objects in a three-dimensional (3D) space.

Radar systems can measure distance, for example, in two ways. In one aspect, a code-modulated signal is sent and the system correlates the received signal (sequence of zeros and ones). The time lag between the correlated signals will be the time taken to travel from the transceiver to the object and return; knowing the speed of propagation of electromagnetic radiation (essentially the speed of light) the distance can be determined. In system using a pseudo-random binary sequence (PRBS), send a sequence with low correlation anywhere but right at the transceiver—(pseudo) random zeroes and ones—so the lag can be determined.

Another aspect employs frequency-modulated continuous-wave radar (FMCW) where a waveform 493 (discussed below with regard to FIGS. 4A and 4B) changes its frequency through time. For example, start at 100 MHz and end at 1.1 GHz and thus a signal with a bandwidth of 1 GHz is sent and it takes about a microsecond to sweep through the frequency. This type of frequency varying signal is also known as a frequency chirp. Here, the frequency modulated signal is transmitted on a given direction and received after it is reflected by an object in the scene. The frequency difference between the receive signal and the transmit signal increases with delay, and hence with the distance at which the object that causes the reflection is located. The received signal is mixed with the transmitted signal (e.g. by a mixer 487). The output of the mixing operation is a signal with a frequency given by the difference of the instantaneous transmitted and received frequencies which is proportional to the distance of the target. The longer the distance, the longer the delay between the transmitted and received frequencies, and the higher the output frequency from the mixer. It should be emphasized that FMCW implementations of the radar waveform generator are exemplary and non-limiting, and other implementations could be employed; e.g., PRBS, or other suitable waveform.

Hardware in accordance with one or more embodiments provides electrical beam steering. To provide directivity, one or more embodiments use a phased array. A phased array can be used in two ways: (i) without relative phase shift between elements, wherein multiple antennas form a beam in a direction normal to the array; (ii) with phase shift between the transmitted waveform at one end of the array compared to the other end of the array. In this case, depending on the relative phase between antenna elements, a beam can be formed and steered in multiple directions.

A phased array primarily receives reflections only from the direction it transmitted to; there is thus a need to move the beam from one point to another. One or more embodiments provide an efficient technique for moving the beam from one point to another. The beam is highly directional and thus it is required to scan it through space. One or more embodiments use a raster scan and electronic beam steering. One or more embodiments both transmit to and receive from the same specific direction, and are simultaneously coordinating so as to steer both the transmitted beam and the received signal. Other embodiments transmit to a first direction and listen in more than one direction. Some radars use omnidirectional transmission, use multiple receive antennas, digitize the information from each antenna and perform the receiver beamforming function in the digital domain.

One or more embodiments employ (1) a waveform generator block, (2) a waveform acquisition block, (3) a phased antenna array, (4) coupling elements, (5) a beam steering and acquisition timing control block, and (6) a processing engine. One or more embodiments ensure that radar waveforms are transmitted and received only when the beam steering operation has been completed.

In one or more embodiments, the timing of events is controlled by the beam steering and timing acquisition control block in such a way that the waveform generator does not depend on inputs from other parts of the system. This enables the system to be flexible in terms of waveform generation and avoids the latency associated with having the waveform generation block wait for a trigger signal. It also enables the use of disaggregated components or components that have not been co-designed but that attain the optimum performance for a given application.

In one or more embodiments, the radar processing units receives the digitized waveform along with timing markers and is not involved in the timing control, thus advantageously avoiding delays.

FIG. 1 depicts a generalized block diagram according to an embodiment of the present invention. Beam steering and acquisition timing control unit 101 can be implemented, for example, in an MCU or FPGA. It provides beam steering control commands to the transmit and receive phased array 107. Radar waveform generator 103 can be implemented, for example, as an FMCW frequency ramp generator. It advises unit 101 when the waveform generation is ON. It provides the waveform to the array 107 via RF coupling elements 105 (e.g. mixers, amplifiers, couplers, and the like) for transmission. It also advises radar waveform acquisition unit 109 (e.g. an analog-to-digital converter (ADC)) when it has turned ON. Unit 109 also obtains steering, new line, and new cycle signals from unit 101, which will be discussed further below. Reflected signals received at array 107 are provided to unit 109 via RF coupling elements 105. Unit 109 outputs a data stream to processing unit 111 which carries out signal processing, image creation and/or display (e.g. a general-purpose computer such as a personal computer (PC)). Advantageously, in one or more embodiments, both the radar waveform generator and the processing unit operate independently; this avoiding latency/delays and/or optimizing the speed of the synchronized beam steering and radar data capture.

Figure 2:
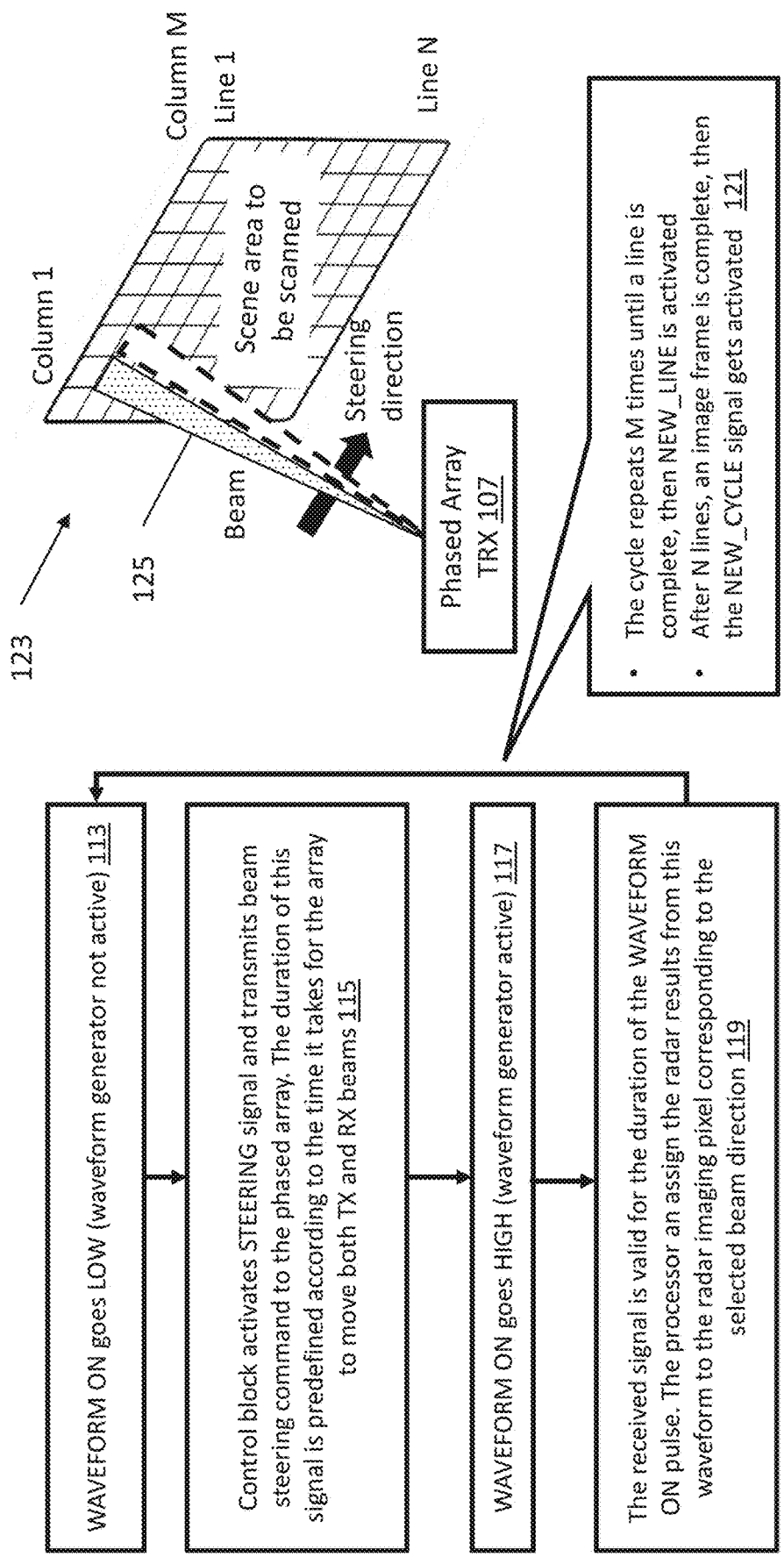
FIG. 2 depicts a coordinated beam steering and data acquisition sequence according to an embodiment of the present invention.

FIG. 2 depicts a coordinated beam steering and data acquisition sequence according to an embodiment of the present invention. In step 113, a WAVEFORM ON signal goes LOW (such that waveform generator 103 is not active). In step 115, control block 101 activates a STEERING signal and transmits beam steering commands to the phased array 107. The duration of this signal is predefined according to the time it takes for the array to move both transmit (TX) and receive (RX) beams. In step 117, the WAVEFORM ON signal goes HIGH (waveform generator 103 goes active). In step 119, the received signal is valid for the duration of the WAVEFORM ON pulse. The processor 111 can assign the radar results from this waveform to the radar imaging pixel corresponding to the selected beam direction. As indicated in step 121, the cycle repeats M times until a line is complete, then the NEW_LINE signal is activated. After N lines, an image frame is complete, then the NEW_CYCLE signal is activated. Furthermore in this regard, as depicted in view 123 of FIG. 2, the scene area to be scanned includes M columns numbered 1 to M and N lines numbered 1 to N. Other numbering conventions could be used; e.g., zero to M−1 and zero to N−1. In the example of view 123, the beam 125 steers from left to right and top to bottom.

Figure 3A:
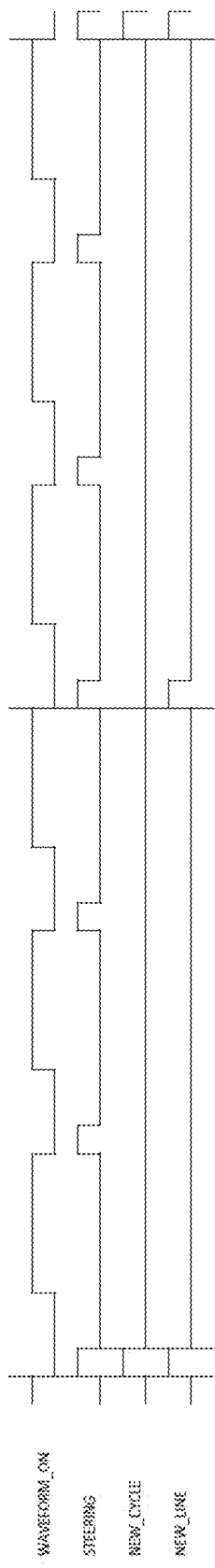
FIG. 3A depicts a first beam steering and acquisition timing control—timing diagram example according to an embodiment of the present invention (synchronous)

FIG. 3A depicts a first exemplary beam steering and acquisition timing control—timing diagram example according to an embodiment of the present invention. The diagram is for a non-limiting example with a raster scan of 3×2 beam directions. That is to say, there are three directions per line (M=3) and two lines total (N=2). In the non-limiting example, a long down time (with no WAVEFORM_ON) is presented to allow more than one user to share the same bandwidth. When signal WAVEFORM ON goes high, this indicates that the RF output of the waveform signal from unit 103 is active, 50 µs long in this example. The WAVEFORM ON signal to allow the array to be reconfigured to move the beam when the generator 103 is not active. Non-limiting exemplary implementations include a synchronized digital signal which is part of the radar waveform generator, and via an RF power detector, discussed below in connection with FIG. 4. Furthermore in this regard, in some instances (e.g., digital), the waveform generator outputs an indicator when waveform generation begins and ends; in other cases (e.g., analog), this is determined using the RF power detector.

The STEERING signal is triggered by the fall of TRANSMIT_ON; in the non-limiting example, its timeframe is 8 µs. The NEW_CYCLE signal is associated with STEERING when the beam direction is 1,1. The NEW_LINE signal is associated with STEERING when the beam direction is (1,M), (2,M) . . . (N,M). Regarding the latter point, N+1 reverts again to 1.

The skilled artisan will appreciate, given the description herein, that in one or more instances, there are two modes of operation. In one mode, described with regard to FIG. 3A, the waveform generator triggers itself using an internal or external clock. This mode may be advantageous when the transmitted waveform has variable length and there is a need for an accurate timing for each beam duration.

Figure 3B:
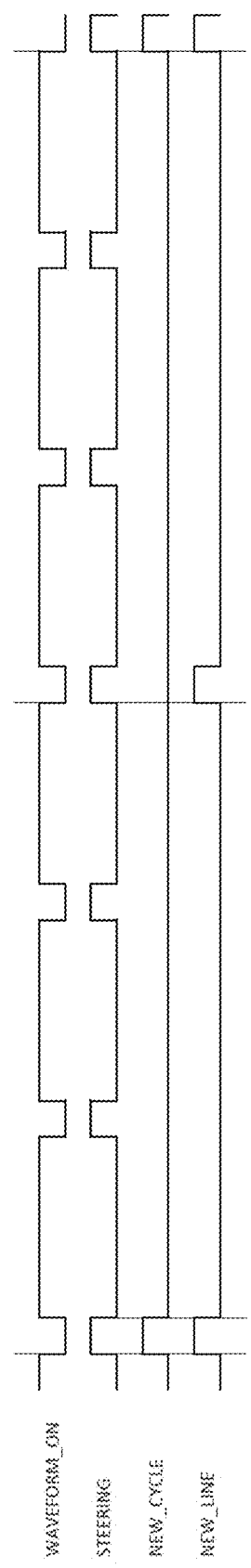
FIG. 3B depicts a second beam steering and acquisition timing control—timing diagram example according to an embodiment of the present invention (asynchronous)

FIG. 3B depicts an alternate beam steering and acquisition timing control—timing diagram example according to an embodiment of the present invention, wherein the waveform generator is triggered by the steering device (fall edge), therefore, maximizing the TRANSMIT ON time.

As noted above, one or more embodiments provide one or more advantages. For example, the waveform generator 103 can operate on its own, creating an output waveform periodically. Different waveform generators can be employed without creating other dependencies in the system implementation. The timing and phased array control 101 can be implemented with an MCU or an FPGA independently, and inexpensively. This control block can be adapted to different phased arrays. The processing unit 111 receives the radar signals and timing markers but it is not necessarily involved in the timing control. This is important since the processing unit generally runs complex SW and depends on an operating system which could introduce latency and timing uncertainties.

One or more embodiments can be employed in a variety of contexts. Purely by way of a non-limiting example, a beam steering control block can be implemented for 60-GHz and 94-GHz applications using FPGA.

Figure 4A:
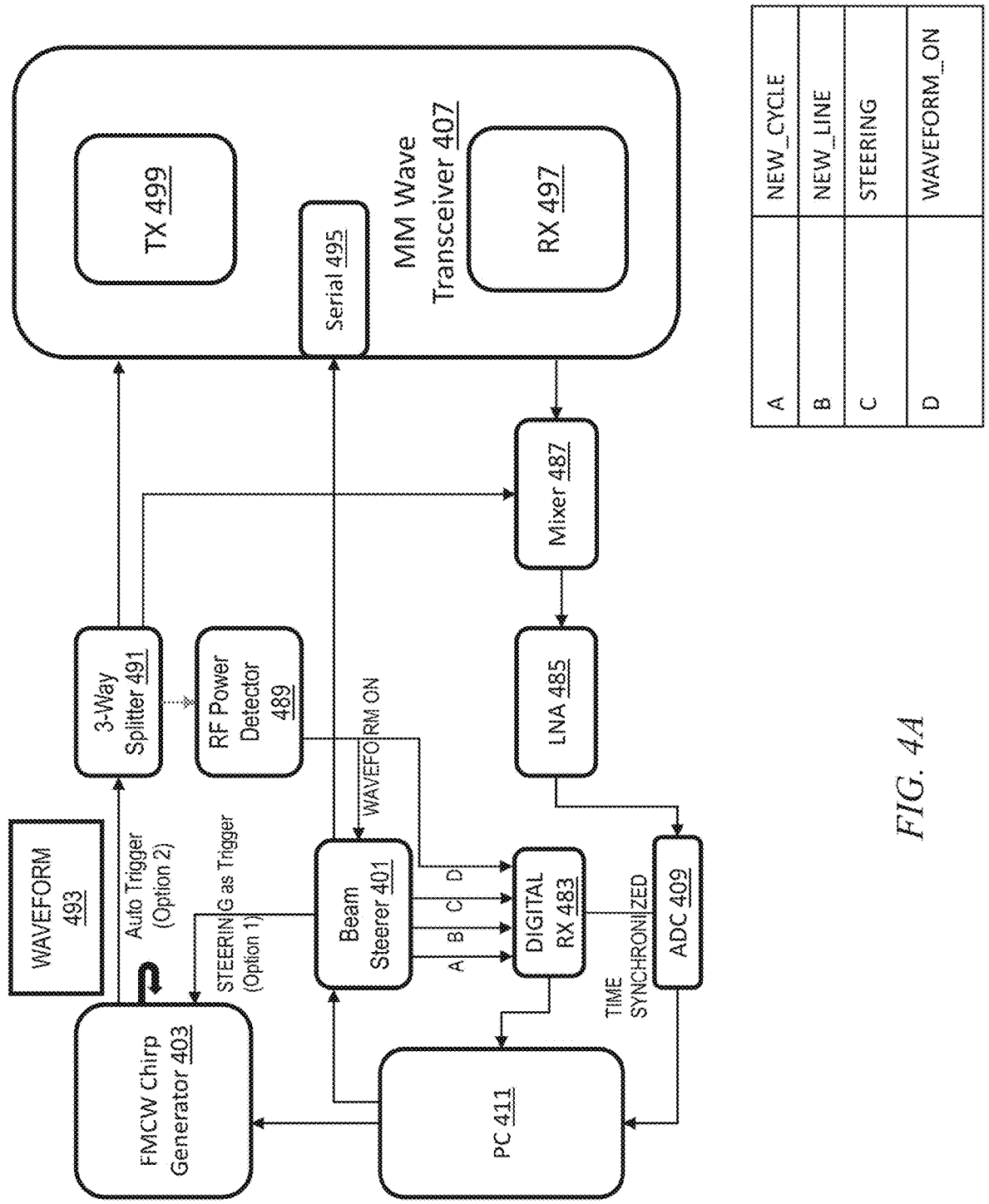
FIG. 4A depicts a specific block diagram for a frequency modulation continuous wave (FMCW) implementation according to an embodiment of the present invention.
Figure 4B:
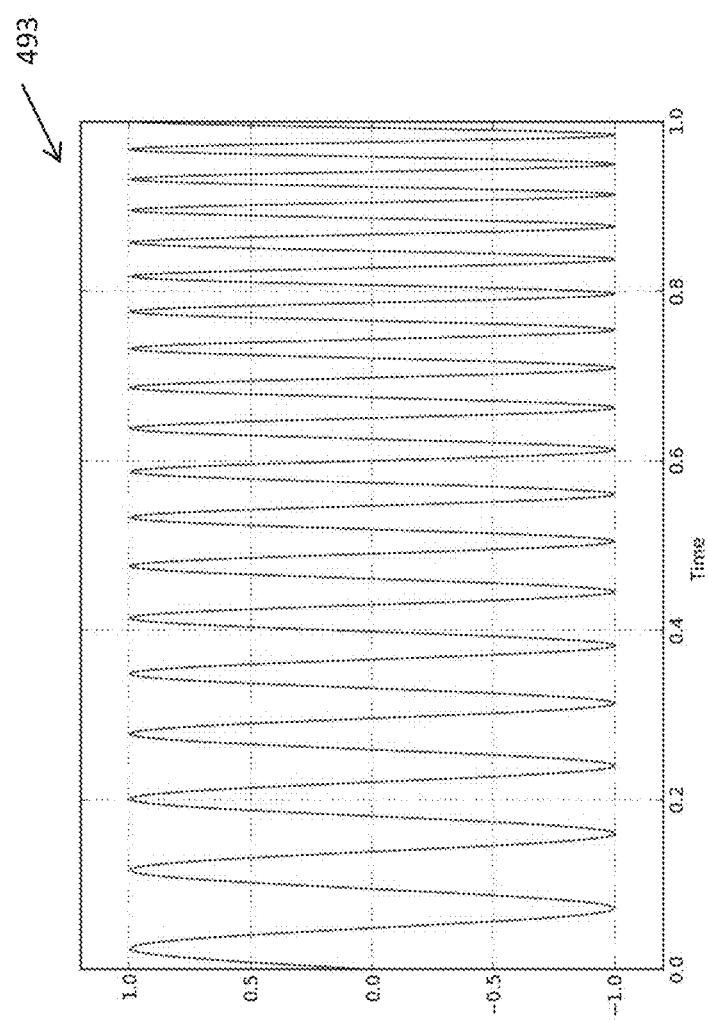
FIG. 4B shows an exemplary waveform generated by the chirp generator of FIG. 4A.

FIG. 4A depicts a specific block diagram for a frequency modulation continuous wave (FMCW) implementation according to an embodiment of the present invention. Any suitable off-the-shelf FMCW chirp generator 403 can be employed. The generated waveform 493, shown in detail in FIG. 4B, is sent to a three-way splitter 491, with an output to the transmitter 499 of transceiver 407, an output to the RF power detector 489 which detects when the waveform transmit is ongoing, from start to end, and an output to the mixer 487; the mixer also receives as an input the received signal from the receiver 497 of the transceiver 407. Two of the three outputs of splitter 491 are used for mixing and the remaining one (to detector 489) is used to know when the waveform has been sent—in one or more embodiments, the third output and the power detector are needed only when the waveform generator does not provide a digital status signal. In FIG. 4B, the x-axis is shown without units and tanging from 0.0 to 1.0 for illustrative purposes; it typically can be anywhere between a microsecond to 500 milliseconds. In a non-limiting example, a 40 microsecond waveform was used in experiments. In FIG. 4B, the y-axis units are −1 to 1 (dimensionless); actual values relate to the maximum power of the transmitter. Note that conventional RF detectors provide HIGH when no RF power is transmitted and switch to LOW when RF is transmitted and switch back to HIGH when the transmit ends.

In one or more embodiments, there is downtime when the transceiver 407 is being reconfigured to move from one direction to another (i.e., STEERING high)—for example, on the scale of microseconds or nanoseconds. (In one or more embodiments, the transceiver is being reconfigured only when STEERING is high. However, the transceiver may not be in use longer if a Sync mode (option discussed elsewhere herein) is selected.) When it is detected that the waveform is finished, detector 489 triggers the beam steerer 401 to steer the beam to the next direction. The beam steerer 401 sends a signal (STEERING high) to indicate the start of the steering process, and to change phase parameters of both TX and RX through the serial port 495 to configure the transceiver to move the beam to the next direction, then it sends a complete signal (STEERING low); this triggers the chirp generator 403 to send another signal. In some embodiments, generator 403 auto-triggers. One or more embodiments do not rely on the trigger provided to the waveform generator as the time to do the windowing because the waveform generator can have a delay of its own or can be inconsistent; this is why one or more embodiments employ the RF power detection.

One or more embodiments configure the beam steerer 401 with the desired direction. The beam steerer has, as input, a start trigger. Once it starts, a waterfall process ensues. In one or more embodiments, feed the information to the beam steerer. The beam steerer can be the trigger to start everything in some instances. For example, configure the initial scan direction to TX 499 and RX 497. Control the chirp generator 403 to start. Refer to waveform graph 493; it is an FMCW waveform with constant amplitude but starts in lower frequency and linearly increases the frequency to meet the maximum target frequency at the end.

As noted, the FMCW chirp generator is a non-limiting example; other waveform generators 103 can be employed as long as the start and end can be either provided or detected by RF power detector (e.g. PRBS). One or more embodiments feed the beam steerer 401 all the desired directions and tell it to begin—refer to the connection between the PC 411 and the beam steerer 401 (USB connections can, for example, be employed between the PC 411 and the beam steerer 401, between the PC 411 and the ADC 409, and between the PC 411 and the generator 403; other types of connection (e.g. Ethernet) can also be employed). The PC 411 that provides the information to the beam steerer 401 can, but need not, be the same as the PC 111 that processes the data. The beam steerer 401 can be an FPGA with its own memory stick, for example. It can trigger itself instead of being triggered by the PC, in some embodiments.

The beam steerer 401 knows the direction and matrix size (e.g. 5×5, 100×50, 1000×10, 3×2). The beam steerer feeds into the transceiver the phases of direction number one. Consider in general an M×N matrix, row by column (R×C). The beam steerer starts with 1,1 and incrementally moves to 1,2; . . . 1,N; then goes to the next row (Row 2)—2,1; 2,2; . . . 2,N. This continues until the scan is complete (M,N). Scans need not necessarily start with 1,1. Whenever the beam is finished moving, the generator 403 is triggered to send the next signal. See the inverse relationship between WAVEFORM_ON and MOVE_BEAM in FIG. 3. It is known whenever direction is changed—this is pertinent in one or more embodiments—it is possible to have one or more than one beam(s) per direction (e.g. chirp twice or more before moving the scan direction). Once the waveform is finished, the beam steerer 401 knows via the 3-way splitter 491 and RF power detector 489 and now it is time to move the beam to the next location.

This process can be viewed, for example, as a loop involving the generator 403 and the beam steerer 401. The PC 411 can trigger the generator 403 or the beam steerer 401 can trigger the generator or there can be external triggering. Orchestration in accordance with one or more embodiments is pertinent regardless of the specifics of "what triggers what." When the beam steerer 401 finishes one row and moves to the next row, it triggers a NEW_LINE signal. Data capture from the ADC 409 is pertinent in one or more embodiments in order to associate the received waveform with the correct location. Once all directions are finished and the process returns to 1,1, a NEW_CYCLE is triggered. An observer (e.g. a program that analyzes a full cycle of directions) from the PC 411, can determine the number of directions in both X and Y, since it is known how many steerings were done in each row and how many rows are in each cycle.

Returning again to FIG. 3A, note transmit on and synchronization. There are two lines with three directions for each line. At 1,1, all three signals are triggered (steering, new cycle, new line). Steering occurs three times and then (at 2,1) a NEW_LINE indication. After an additional three directions, all six directions completed and all three signals are triggered again to indicate direction 1,1.

Now with attention back again to FIG. 4A, in one or more embodiments, the beam steerer 401 is an independent component from the PC 411. The steerer 401 can be triggered by the PC and/or uploaded with information by the PC. The generator 403 can also be a separate component that responds to an external trigger and provides an output or the RF detector 489 can be used to determine when waveform generation starts and ends.

In FIG. 4A note also the low-noise amplifier (LNA) 485 and the digital receiver 483. In one or more embodiments, the digital receiver 483 and the ADC 409 are time synchronized.

One or more embodiments advantageously provide a loosely coupled task sequencing scheme that yields a highly efficient system. Referring again to FIG. 1, note that in one or more embodiments, the data stream between ADC 109 and processor 111 is disengaged from the different timing mechanisms. Once the ADC is in place, all the information can be processed on a PC. Steering, New Line, and New Cycle signals are digital I/O in one or more embodiments.

In one or more embodiments using FMCW, the mixed signals are at a much lower frequency than the RF frequency. For example, the RF frequency can be at the GHz level, while the data can be at the kHz level or MHz level or tens of MHz level. One or more embodiments advantageously provide efficient task scheduling with real-time offline processing by a PC 111 that receives the data stream from the system.

Figure 5:
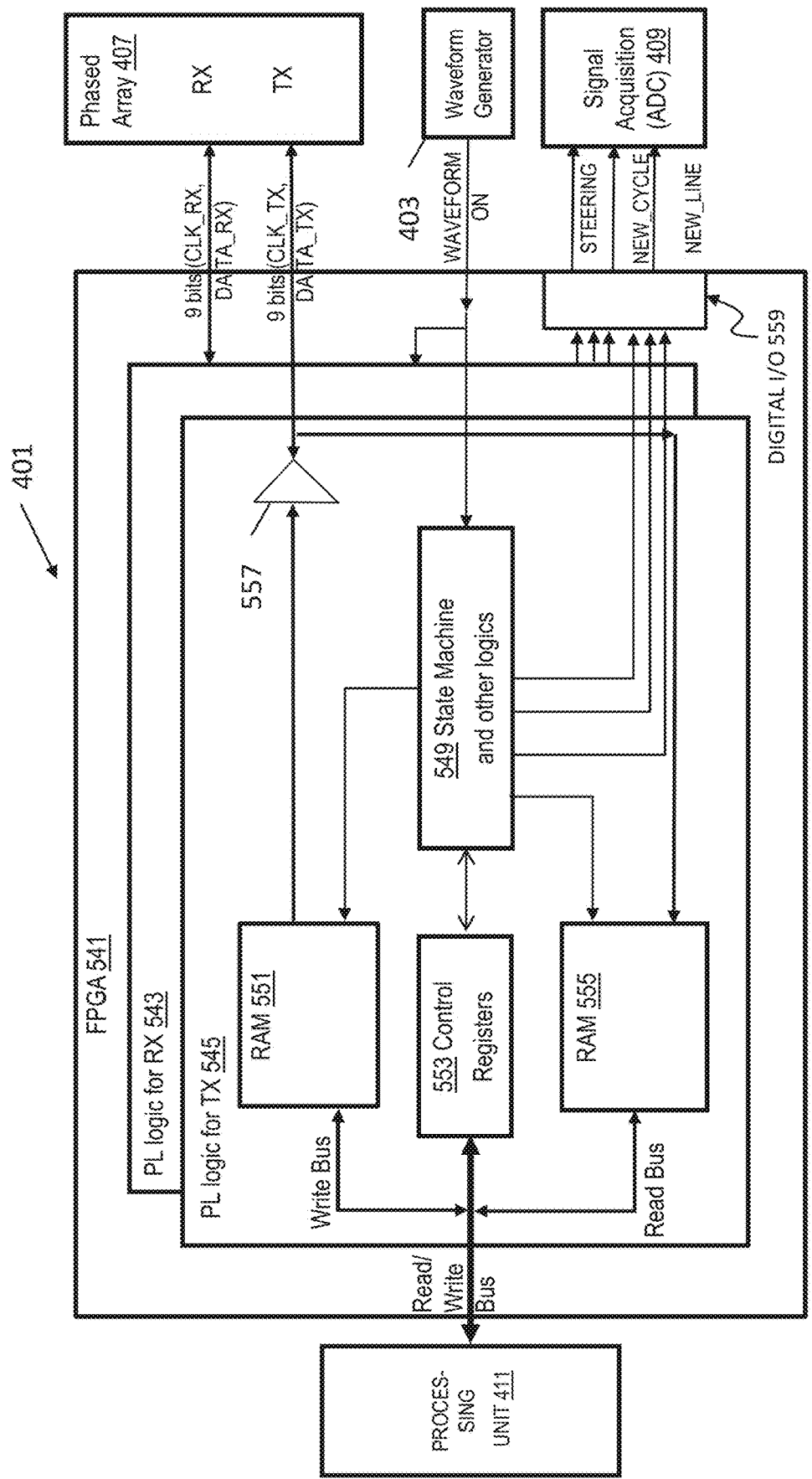
FIG. 5 depicts an FPGA implementation for radar configuration according to an embodiment of the present invention.

FIG. 5 shows an exemplary detailed implementation of a beam steering control block (e.g. 401) using an FPGA 541 (application-specific integrated circuit (ASIC) implementations are also possible). Blocks 551, 553, and 555 are memory units to store the configuration values needed for operation of the beam steering. Blocks 551 and 555 are random access memory (RAM) blocks. In one or more embodiments, block 551 is used for saving the phase vectors for each beam direction and block 555 is used for the internal state machine and logics. State machine 549 implements the state machine shown in FIG. 7. Element 557 is a buffer. Programmable logic is included for both receive 543 and transmit 545 aspects. Note interconnections with processing unit 411 (a PC is a non-limiting example, an ARM processor co-integrated with the FPGA is another non-limiting example), antenna array 407, waveform generator 403, and ADC 409 (e.g. via digital input/output 559). In a non-limiting example, application code on unit 411 is written in the PYTHON language. Block 549 includes state machine logic and other logic (as needed).

The table of FIG. 6 shows the various signal names, the direction (into or out of the system or both), and the corresponding functions. The ENABLE, CLK, and DATA signals for the transmitter (TX) and receiver (RX) are respectively provided between portions 545 to the TX and 543 and the RX.

Figure 7:
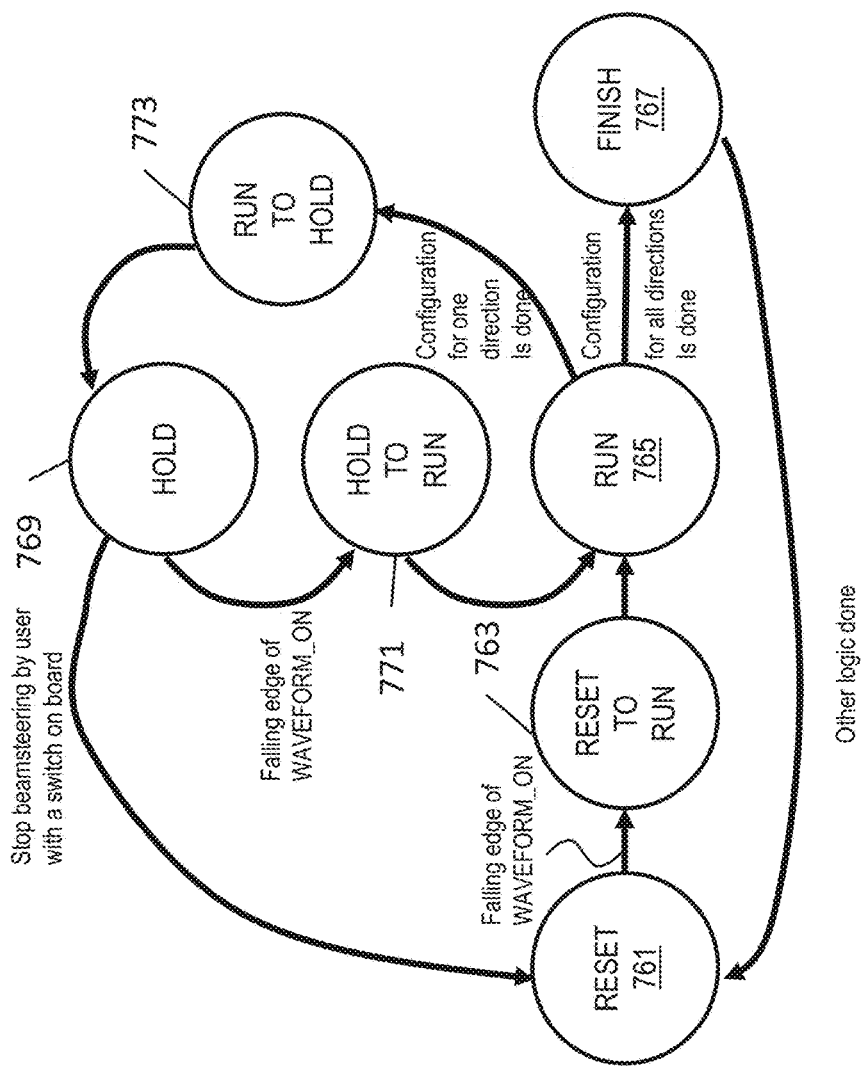
FIG. 7 depicts state machine details for beam steering according to an embodiment of the present invention.

FIG. 7 shows the state machine logic for state machine 549. State RESET 761 resets all counters and de-asserts all outputs. RESET TO RUN state 763 asserts NEW_CYCLE, STEERING, and NEW_LINE. RUN state 765 carries out beamforming configuration for one direction in the beam steering. It increases the counter for pulse width if NEW_CYCLE or NEW_LINE is active. It de-asserts NEW_CYCLE and NEW_LINE if the above counter reaches the programmed pulse width and resets the counter. RUN TO HOLD state 773 de-asserts STEERING and increases the counter for the number of directions in a line. HOLD state 769 takes no action. HOLD TO RUN state 771 asserts STEERING and asserts NEW_LINE if the counter for the number of directions in a line reaches the defined number of directions per line. The processes finishes in FINISH state 767.

It is worth noting that in current commercial radar systems, the main approach used for obtaining multidirectional data is the multiple-input and multiple-output (MIMO) approach. In MIMO, rather than forming a beam in space, the entire scene is illuminated, or, in some instances, a few coarse beams are formed. One pertinent distinction of one or more embodiments from the prior-art MIMO approach is noted on the receiver side. Current automotive radars typically use a few receive elements (on the order of four) and digitize the signal received by each of the (few) antennas. The beams are formed in the digital domain by post-processing after digitization. This has the advantage of looking at multiple directions simultaneously and is thus potentially faster than systems wherein the beam needs to be moved. However, there are several disadvantages, for example: (i) an ADC and signal processing engine are needed behind each antenna; and (ii) a reflection from one object may completely blind the system. Regarding the latter aspect, for example, if there is a very large object in front, it may not be possible to distinguish one small object to the right, because the energy from the large object overwhelms the (e.g., four) receivers. This can be compared to one or more embodiments of the invention, wherein the receive beam is formed in the RF domain. The receiver beamforming gain is maximized in a specific direction and therefore the interference from undesired directions is reduced. Moreover, only a single ADC and signal processing engine are needed to support the entire array of receiver antennas. However, the beam needs to be moved in each direction of interest one step at a time. Current MIMO systems work well, and are cost-effective, with respect to detecting coarse objects in front of a vehicle, but do not scale well and are not well-suited to high-resolution three-dimensional imaging. One or more embodiments of the invention, in contrast, are well-suited to high-resolution imaging enabling 3-D perception.

One or more embodiments advantageously employ a single waveform generation block and a single signal acquisition block, with tight coordination between beam steering and signal acquisition. The waveform block and acquisition block can be separate/disaggregated/not co-designed in some instances; i.e., not integrated on the same chip or not even on the same board.

One or more embodiments employ an analog phased array (as opposed, e.g., to multiple-input and multiple-output (MIMO)) wherein the components are disaggregated, wherein a single waveform generator and a single ADC are employed for the entire phased array, and/or wherein a single output stream is employed. One or more embodiments operate with a constant delay that only occurs when changing direction; change the transmit and receive directions simultaneously; and/or employ a time for capture that starts and ends with the radar signal waveform (e.g. frequency chirp). One or more embodiments use one common radar signal source generator (e.g. chirp generator), which is loosely coupled with the transmit line.

Given the discussion thus far, it will be appreciated that, in general terms, an exemplary method, according to an aspect of the invention, includes the step of, while a radar waveform generator 103, 403 coupled to a phased antenna array 107, 407 is inactive (step 113), providing a beam steering command (step 115) to the phased antenna array to cause the phased antenna array be configured for a given transmit and receive direction. A further step includes, while the radar waveform generator is active (step 117), assigning received radar results to the given transmit and receive direction (step 119). A further step 121 includes repeating the providing of the command and the assigning for a plurality of additional transmit and receive directions corresponding to a desired scan area. This process can repeat in an orderly fashion; e.g., going by row from left to right and top to bottom, as seen in FIG. 2, but this is exemplary and non-limiting; it could go from right to left and/or bottom to top, or could go in a different order entirely.

In the non-limiting exemplary embodiment depicted at 123 in FIG. 2, the desired scan area includes a plurality of scan rows, and the repeating step includes repeating the providing of the command and the assigning for a plurality of the additional transmit and receive directions corresponding to a first one of the scan rows (e.g. Line 1); and repeating the providing of the command, the assigning, and the repetition thereof for a plurality of additional ones of the scan rows (e.g. till line N is completed).

One or more embodiments further include repeating the providing of the command, the assigning, the repetition of the providing and assigning for the plurality of additional transmit and receive directions, and the repetition for the plurality of additional scan rows, for a plurality of additional scans (e.g. after NEW_CYCLE is activated).

In one or more embodiments, timing of the beam steering command is controlled by a beam steering and timing acquisition control block 101, 401 such that the waveform generator 103, 403 does not depend on inputs from any components other than the beam steering and timing acquisition control block.

In one or more instances, a further step includes controlling the waveform generator 103, 403 to be active only when the phased antenna array 107, 407 has been completely configured for the given transmit and receive direction in accordance with the beam steering command (as shown in FIG. 4A, no chirp until beam movement completed).

In one or more embodiments, the assigning of the received radar results to the given transmit and receive direction is carried out by a processing unit 111, 411 which receives a digitized waveform and timing markers and does not participate in the timing of the beam steering command.

In one or more instances, the waveform generator and the processing unit are operated independently.

Some embodiments detect that the waveform generator is active using a radio frequency power detector 489 coupled to an output of the waveform generator and an input of the beam steering and timing acquisition control block.

One or more embodiments further include configuring the phased antenna array 107, 407 for the given transmit and receive direction in accordance with the beam steering command.

In another aspect, an exemplary system includes a radar waveform generator 103, 403; a phased antenna array 107, 407 coupled to the radar waveform generator; a beam steering and timing acquisition control block 101, 401 coupled to the radar waveform generator and the phased antenna array; and a processing unit 111, 411 coupled to the beam steering and timing acquisition control block.

Said beam steering and timing acquisition control block is configured to provide a beam steering command to the phased antenna array to cause the phased antenna array be configured for a given transmit and receive direction, while the radar waveform generator is inactive (see above discussion of steps 113, 115). Radar results (received signals reflected from an object in the scan area) corresponding to the given transmit and receive direction are received at the phased array antenna for a time period while the radar waveform generator is active and the processing unit assigns the received radar results to the given transmit and receive direction (see above discussion of steps 117, 119). the beam steering and timing acquisition control block causes repetition of the providing of the beam steering command and the receiving of the results for a plurality of additional transmit and receive directions corresponding to a desired scan area (see above discussion of step 121). A desired scan area is simply a scene that it is desired to survey via radar; e.g., the area in front of and to the sides of a motor vehicle traveling forward.

In one or more embodiments, as seen at 123 in FIG. 2, the desired scan area includes a plurality of scan rows, and wherein the repetition includes the beam steering and timing acquisition control block causing repetition of the providing of the beam steering command and the receiving of the results for a plurality of additional transmit and receive directions corresponding to a scan row (e.g. Row 1); and the beam steering and timing acquisition control block causing repetition of the providing of the beam steering command, the receiving of the results, and the repetition thereof for a plurality of additional scan rows (e.g. rows 2-N).

In some instances, there are two modes of operation (synchronous and asynchronous—see above discussion of FIGS. 3A and 3B). Some embodiments employ a constant scan speed regardless of the potential number of beam directions—see timing diagram FIG. 3A. Other embodiments operate back-to-back, filling the whole possible transmit time (see FIG. 3B). Beam completion triggers the wave generator and once the waveform is finished, it triggers beam steering.

In one or more embodiments, the beam steering and timing acquisition control block 101, 401 causes repetition of the providing of the command, the assigning, the repetition of the providing and assigning for the plurality of additional transmit and receive directions, and the repetition for the plurality of additional scan rows, for a plurality of additional scans (e.g. upon activation of the NEW_CYCLE signal).

In some instances, the beam steering and timing acquisition control block 101, 401 controls timing of the beam steering command such that the waveform generator 103, 403 does not depend on inputs from any components other than the beam steering and timing acquisition control block.

In some instances, the beam steering and timing acquisition control block 101, 401 controls the waveform generator 103, 403 to be active only when the phased antenna array 107, 407 has been completely configured for the given transmit and receive direction in accordance with the beam steering command (as shown in FIG. 4A, no chirp until beam movement completed).

In some cases, the processing unit receives a digitized waveform and timing markers and does not participate in the timing of the beam steering command.

In some embodiments, the waveform generator and the processing unit operate independently.

Some instances further include a radio frequency power detector 489 coupled to an output of the waveform generator and an input of the beam steering and timing acquisition control block, which detects that the waveform generator is active.

In some cases, the radar waveform generator includes a frequency modulation continuous wave chirp generator 403 and the phased antenna array is configured for millimeter wave operation (e.g. wavelengths from ten to one millimeter).

In one or more embodiments, the beam steering and timing acquisition control block is implemented as at least one of a field programmable gate array 541 and a microcontroller unit.

In one or more embodiments, the beam steering command causes the phased antenna array to be configured for the given transmit and receive direction in accordance with the beam steering command (in a phased array, the radio frequency current from the transmitter is fed to the individual antennas with the correct phase relationship so that the radio waves from the separate antennas add together to increase the radiation in a desired direction, while cancelling to suppress radiation in undesired directions; further, the power from the transmitter is typically fed to the antennas through phase shifters, controlled by a computer system, which can alter the phase electronically, thus steering the beam of radio waves to a different direction).

Figure 8:
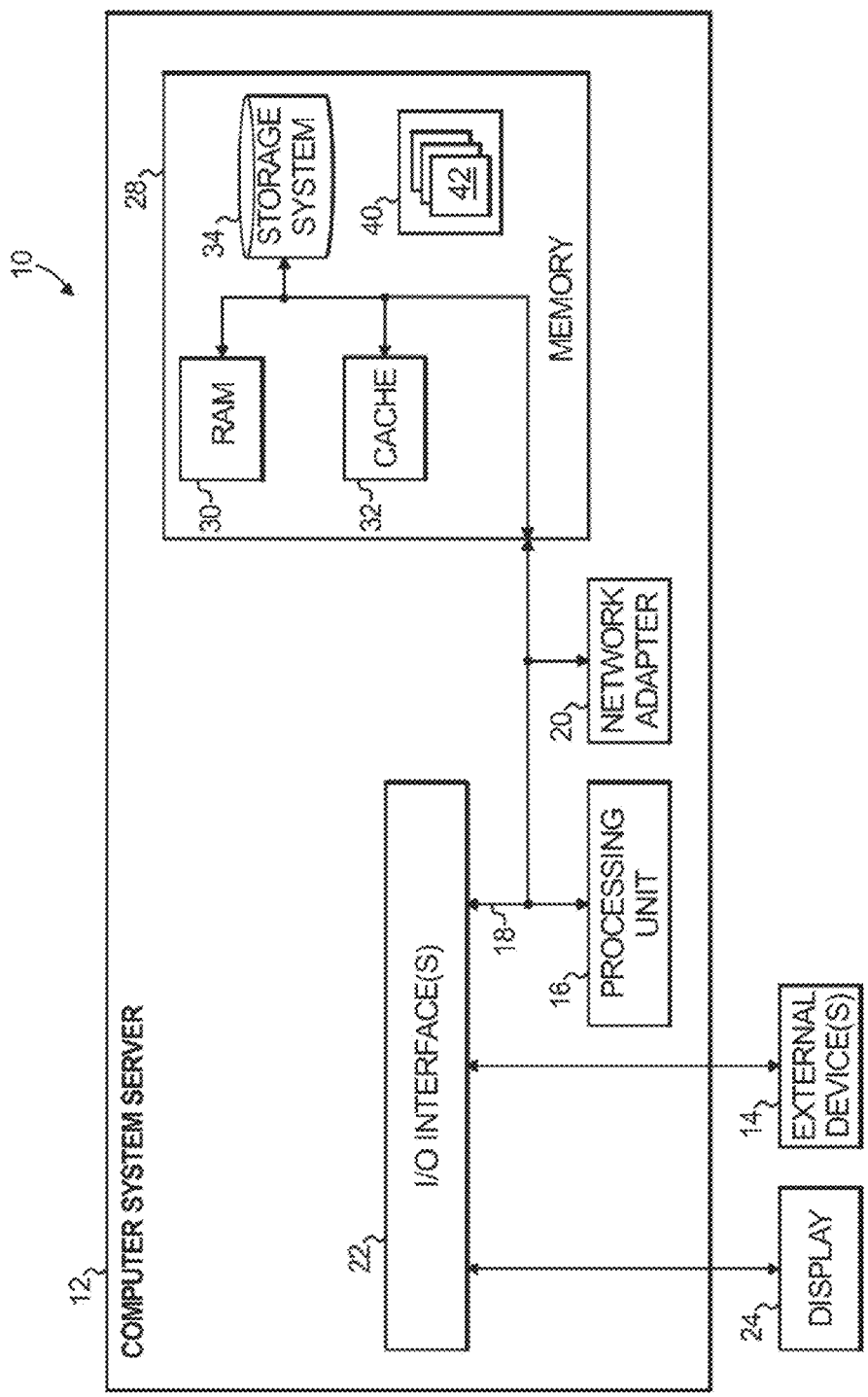

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention (e.g. processing unit 111, 411). Referring now to FIG. 8, system 10 is only one example and is not intended to suggest any limitation as to the scope of use or functionality of embodiments of the invention described herein. Regardless, system 10 is capable of being implemented and/or performing any pertinent aspects of the functionality set forth hereinabove.

In system 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

Data can be provided to system 12 via an ADC 109, 409 over, for example, interface(s) 22 and/or adapter 20.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   while a radar waveform generator coupled to a phased antenna array is inactive, providing a beam steering command to said phased antenna array to cause said phased antenna array be configured for a given transmit and receive direction;
   while said radar waveform generator is active, assigning received radar results to said given transmit and receive direction; and
   repeating said providing of said command and said assigning for a plurality of additional transmit and receive directions corresponding to a desired scan area;
   wherein:
   timing of said beam steering command is controlled by a beam steering and timing acquisition control block such that said waveform generator does not depend on inputs from any components other than said beam steering and timing acquisition control block; and
   said assigning of said received radar results to said given transmit and receive direction is carried out by a processing unit which receives a digitized waveform and timing markers and does not participate in said timing of said beam steering command.

2. The method of claim 1, wherein said desired scan area comprises a plurality of scan rows, and wherein said repeating step comprises:
   repeating said providing of said command and said assigning for a plurality of said additional transmit and receive directions corresponding to a first one of said scan rows; and
   repeating said providing of said command, said assigning, and said repetition thereof for a plurality of additional ones of said scan rows.

3. The method of claim 2, further comprising repeating said providing of said command, said assigning, said repetition of said providing and assigning for said plurality of additional transmit and receive directions, and said repetition for said plurality of additional scan rows, for a plurality of additional scans.

4. The method of claim 1, further comprising controlling said waveform generator to be active only when said phased antenna array has been completely configured for said given transmit and receive direction in accordance with said beam steering command.

5. The method of claim 1, configuring said phased antenna array for said given transmit and receive direction in accordance with said beam steering command.

6. A method comprising:
   while a radar waveform generator coupled to a phased antenna array is inactive, providing a beam steering command to said phased antenna array to cause said phased antenna array be configured for a given transmit and receive direction;
   while said radar waveform generator is active, assigning received radar results to said given transmit and receive direction;
   repeating said providing of said command and said assigning for a plurality of additional transmit and receive directions corresponding to a desired scan area; and
   controlling said waveform generator to be active only when said phased antenna array has been completely configured for said given transmit and receive direction in accordance with said beam steering command;
   wherein timing of said beam steering command is controlled by a beam steering and timing acquisition control block such that said waveform generator does not depend on inputs from any components other than said beam steering and timing acquisition control block; and
   wherein said assigning of said received radar results to said given transmit and receive direction is carried out by a processing unit which receives a digitized waveform and timing markers and does not participate in said timing of said beam steering command.

7. The method of claim 6, further comprising operating said waveform generator and said processing unit independently.

8. The method of claim 7, further comprising detecting that said waveform generator is active using a radio frequency power detector coupled to an output of said waveform generator and an input of said beam steering and timing acquisition control block.

9. A system comprising:
   a radar waveform generator;
   a phased antenna array coupled to said radar waveform generator;
   a beam steering and timing acquisition control block coupled to said radar waveform generator and said phased antenna array; and
   a processing unit coupled to said beam steering and timing acquisition control block;
   wherein:
   said beam steering and timing acquisition control block is configured to provide a beam steering command to said phased antenna array to cause said phased antenna array be configured for a given transmit and receive direction, while said radar waveform generator is inactive;
   radar results corresponding to said given transmit and receive direction are received at said phased array antenna for a time period while said radar waveform generator is active and said processing unit assigns said received radar results to said given transmit and receive direction;
   said beam steering and timing acquisition control block causes repetition of said providing of said beam steering command and said receiving of said results for a plurality of additional transmit and receive directions corresponding to a desired scan area;
   said beam steering and timing acquisition control block controls timing of said beam steering command such that said waveform generator does not depend on inputs from any components other than said beam steering and timing acquisition control block; and
   said radar waveform generator and said processing unit operate independently.

10. The system of claim 9, wherein said desired scan area comprises a plurality of scan rows, and wherein said repetition comprises:

said beam steering and timing acquisition control block causing repetition of said providing of said beam steering command and said receiving of said results for a plurality of additional transmit and receive directions corresponding to a scan row; and said beam steering and timing acquisition control block causing repetition of said providing of said beam steering command, said receiving of said results, and said repetition thereof for a plurality of additional scan rows.

11. The system of claim 10, wherein said beam steering and timing acquisition control block causes repetition said providing of said command, said assigning, said repetition of said providing and assigning for said plurality of additional transmit and receive directions, and said repetition for said plurality of additional scan rows, for a plurality of additional scans.

12. The system of claim 9, wherein said beam steering and timing acquisition control block controls said waveform generator to be active only when said phased antenna array has been completely configured for said given transmit and receive direction in accordance with said beam steering command.

13. The system of claim 9, wherein said beam steering command causes said phased antenna array to be configured for said given transmit and receive direction in accordance with said beam steering command.

14. A system comprising:
a radar waveform generator;
a phased antenna array coupled to said radar waveform generator;
a beam steering and timing acquisition control block coupled to said radar waveform generator and said phased antenna array; and
a processing unit coupled to said beam steering and timing acquisition control block;
wherein:
said beam steering and timing acquisition control block is configured to provide a beam steering command to said phased antenna array to cause said phased antenna array be configured for a given transmit and receive direction, while said radar waveform generator is inactive;
radar results corresponding to said given transmit and receive direction are received at said phased array antenna for a time period while said radar waveform generator is active and said processing unit assigns said received radar results to said given transmit and receive direction;
said beam steering and timing acquisition control block causes repetition of said providing of said beam steering command and said receiving of said results for a plurality of additional transmit and receive directions corresponding to a desired scan area;
said beam steering and timing acquisition control block controls timing of said beam steering command such that said waveform generator does not depend on inputs from any components other than said beam steering and timing acquisition control block;
said beam steering and timing acquisition control block controls said waveform generator to be active only when said phased antenna array has been completely configured for said given transmit and receive direction in accordance with said beam steering command; and
said processing unit receives a digitized waveform and timing markers and does not participate in said timing of said beam steering command.

15. The system of claim 14, wherein said waveform generator and said processing unit operate independently.

16. The system of claim 14, further comprising a radio frequency power detector coupled to an output of said waveform generator and an input of said beam steering and timing acquisition control block, which detects that said waveform generator is active.

17. The system of claim 16, wherein said radar waveform generator comprises a frequency modulation continuous wave chirp generator and said phased antenna array is configured for millimeter wave operation.

18. The system of claim 17, wherein said beam steering and timing acquisition control block is implemented as at least one of a field programmable gate array and a microcontroller unit.

* * * * *